United States Patent [19]

Beckmann et al.

[11] Patent Number: 4,693,729
[45] Date of Patent: Sep. 15, 1987

[54] METHOD FOR GASIFYING SOLID FUELS

[75] Inventors: Georg Beckmann, Vienna; Bruno Hillinger, Hinterbrühl, both of Austria; Bodo Wolf, Freital, German Democratic Rep.

[73] Assignee: Waagner-Biro Aktiengesellschaft, Austria

[21] Appl. No.: 825,628

[22] Filed: Feb. 3, 1986

[30] Foreign Application Priority Data

Feb. 7, 1985 [AT] Austria .................................. 348/85

[51] Int. Cl.⁴ ............................ C10J 3/12; C10J 3/14; C10J 3/16
[52] U.S. Cl. ........................................ 48/203; 48/206; 48/210
[58] Field of Search .............. 48/203, 206, 210, 197 R

[56] References Cited

U.S. PATENT DOCUMENTS

| | | | |
|---|---|---|---|
| 538,908 | 5/1895 | Gobbe | 48/206 |
| 1,273,474 | 7/1918 | Fleischer | 48/203 |
| 1,977,689 | 10/1934 | Lucke | 48/206 |
| 2,591,595 | 4/1952 | Ogorzaby | 48/210 |
| 2,659,668 | 11/1953 | Mayland | 48/206 |
| 4,464,183 | 8/1984 | Arisaki | 48/210 |
| 4,530,702 | 7/1985 | Fetters et al. | 48/203 |

FOREIGN PATENT DOCUMENTS 0283414 10/1952 Switzerland .

Primary Examiner—Peter Kratz
Attorney, Agent, or Firm—Steinberg & Raskin

[57] ABSTRACT

A method of generating a low-tar generator gas includes contacting the hot tar-containing generator gas in a contact zone with ballast bodies to cool the generator gas and capture tar and dust on the exposed surfaces of the ballast bodies, and admixing the thus heated ballast bodies to the wet solid fuel to be gasified to dry and pre-heat such fuel in preparation for the actual gasification which is performed in two separate gasification zones which are arranged one above the other by reacting the solid fuel with an oxygen-containing gasification medium that is introduced from above into the upper one, and from below into the lower one, of the gasification zones with attendant formation of two conflagration fronts in the gasification zones. The generator gas which is thus generated in the two gasification zones is discharged through a common discharge conduit which has the contact zone incorporated therein. An arrangement for performing this method includes a contact apparatus which bounds the contact zone, is incorporated in the discharge conduit and contains a bed of the ballast bodies, the bed being replenished by ballast bodies which have been separated from ashes after they have been discharged from the lower one of the gasification zones.

11 Claims, 1 Drawing Figure

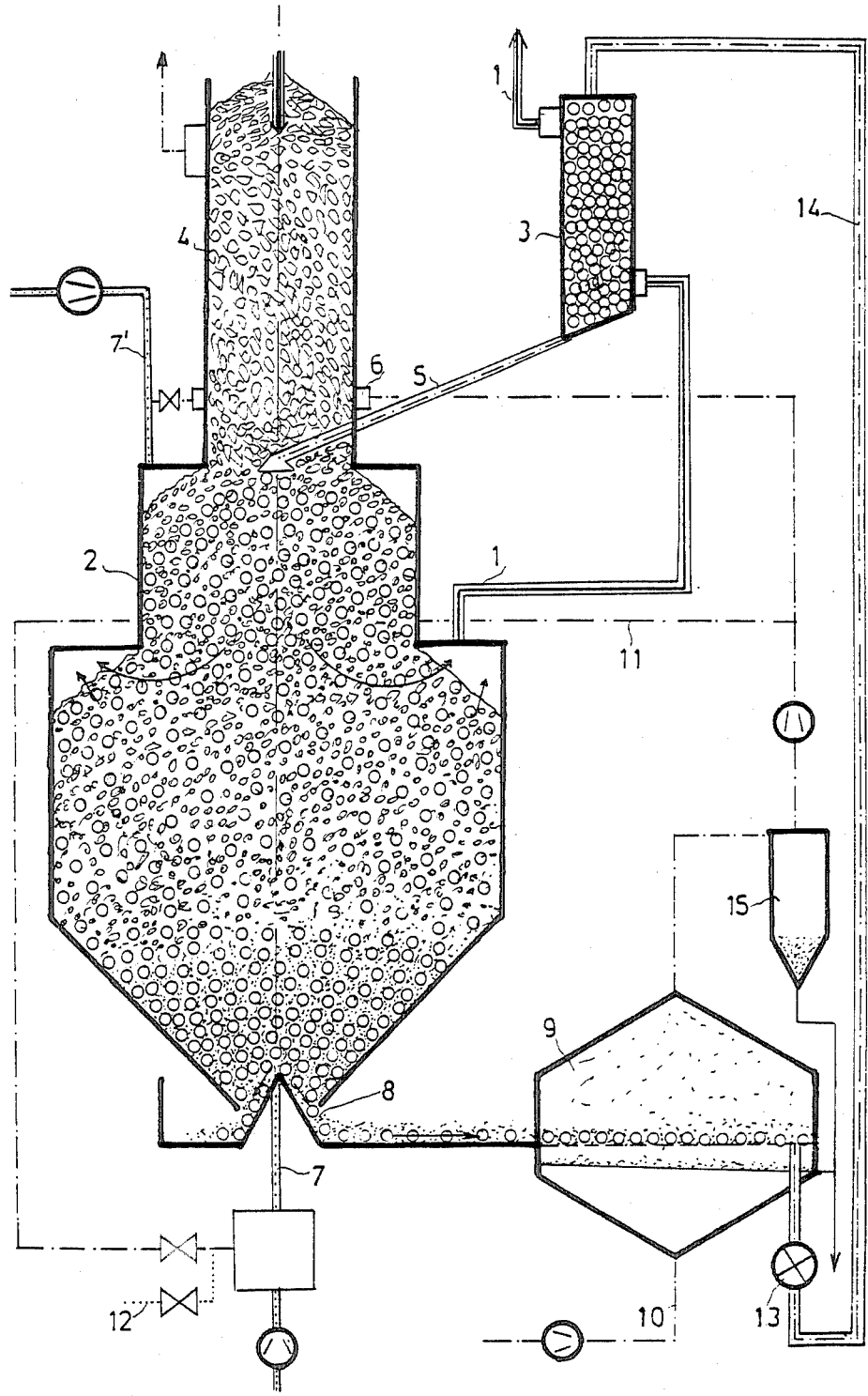

METHOD FOR GASIFYING SOLID FUELS

BACKGROUND OF THE INVENTION

The present invention relates generally to a method and arrangement for generating low-tar generator gas from a solid fuel, and more particularly to such a method and arrangement which are particularly suited for gasifying relatively low-quality solid fuels, such as bituminous solid fuels.

There is already known a multitude of methods and arrangements of the above-mentioned kind, among them such in which the solid fuel is gasified in two gasification zones by being reacted at the requisite gasification temperature with a gaseous gasification medium which at least in part contains oxygen and water vapor, and in which one part of the thermal energy needed for the gasification is obtained by combusting the solid fuel with the gasification medium, while another part of such thermal energy is supplied to the solid fuel by retrieving a part of the sensible waste heat carried out of the generator by the discharged generator gas and returning this retrieved part back into the generator by means of heated solid bodies which are admixed to the solid fuel in the gasification zone for travel therewith and discharge, together with ashes resulting from the gasification process, from the generator and subsequent separation thereof from the ashes for recycling into the solid fuel in the generator.

However, experience has shown that the heretofore known methods and arrangements of the above-mentioned kind possess the drawback that the produced generator gas is at a relatively high temperature and that, at the same time, external heat supply which is of a nature inconsistent with the gasification process is being used for the drying of the solid fuel to be gasified and/or for the pre-heating of such solid fuel, this external heat supply being made available at least in part by a partial combustion of the fuel to be gasified. In addition thereto, the ash contents of the solid fuel to be gasified constitutes a criterion for the continuous gasification of the solid fuel, so that solid fuels with low ash contents cannot be gasified in such gasifying installations.

It is already known from the Swiss Patent No. 283.414 to produce generator gas in such a manner that solid bodies are first heated in an external heating zone and then are admixed to the solid fuel to be gasified and de-gassed. The de-gassed ash-solid body mixture is then cooled by evaporation of a sprayed-in liquid. The produced generator gas is supplied to the user thereof in its cooled condition. Instead of solid fuels, as disclosed in U.S. Pat. Nos. 1,977,684 and 2,590,869, there can be used a gas, such as methane, and CO and $H_2$ are produced by cracking processes. However, in neither one of these known developments are the solid bodies being heated by the generator gas or the $CO/H_2$ mixture for the retrieval of the heat from such gases. In addition, the gasification medium is not fed into the apparatus of these known arrangement both above and below the generator gas discharge region, so that two separate gasification zones would be obtained in the same apparatus or generator. This brings about, in addition to an increase in the solid fuel consumption, also an increase in the required size of the installation, so that the economy of these installations is questionable especially in view of the current high prices of fuel.

SUMMARY OF THE INVENTION

Accordingly, it is a general object of the present invention to avoid the disadvantages of the prior art.

More particularly, it is an object of the present invention to improve the economy of the gasification process.

It is yet another object of the present invention to increase the amount of solid residue leaving the gasification process so as to be able to gasify even fuels with low ash contents, such as sewage sludge.

In keeping with these objects and others which will become apparent hereafter, one feature of the present invention resides in a method of generating low-tar generator gas from a solid, particularly bituminous, fuel, which method comprises the steps of converting the soild fuel into tar-container generator gas in two gasification zones arranged above one another, including preheating the solid fuel in at least one of the gasification zones by contact with hot ballast bodies which are admixed to the solid fuel, and introducing a gasification medium which at least in part contains oxygen and water vapor from above into the upper one and from below into the lower one of the gasification zones for the gasification medium to contact and partially combust the solid fuel under the formation of separate conflagration fronts in the gasification zones with attendant generation of additional heat that brings the solid fuel to the requisite gasification temperature; discharging the hot tar-containing generator gas produced in both gasification zones from a region situated between the two gasification zones; contacting the ballast bodies in a contact zone with the hot tar-containing generator gas to heat the ballast bodies prior to their mixing with the solid fuel and for the ballast bodies to capture and return into the respective gasification zone at least a significant proportion of the tar contained in the generator gas; and recycling the ballast bodies after their discharge, together with ashes resulting from the gasification process, from the gasification zones, including separating the ballast bodies from the ashes, and returning the separated ballast bodies into the contact zone.

It is further advantageous when the method of the present invention further comprises the step of controlling the location of the conflagration fronts by controlling the amounts of the gasification medium introduced above and below the point of discharge of the hot generator gas, respectively. The method of the present invention may also further comprise the step of regulating the temperature at least in the lower one of the gasification zones by adding at least one of water vapor and $CO_2$ to the gasification medium introduced into the respective gasification zone. The separating step advantageously includes sieving the fine ashes from the ballast bodies. According to another aspect of the present invention, the contacting step includes utilizing the ballast bodies which are colder than the hot tar-containing generator gas as filtering material for precipitated tar particles and dust present in the generator gas which collect on the exposed surfaces of the ballast bodies and are thus returned into the respective gasification zone with the ballast bodies for heating the solid fuel in the respective gasification zone. The method of the invention may also further comprise the step of cooling the ballast bodies after their discharge from the respective gasification zone by contacting the same with a gaseous medium, and utilizing the thus heated gaseous medium for drying the solid fuel prior to its introduction into the respective gasification zone.

The present invention also relates to an arrangement for gasifying solid fuel, especially lignite, such arrangement comprising generator means for converting the solid fuel into tar-containing generator gas in two gasification zones arranged above one another, including means for admixing hot ballast bodies to the solid fuel to contact and preheat the solid fuel in at least one of the gasification zones, and means for introducing a gasification medium which at least in part contains oxygen and water vapor from above into the upper one and from below into the lower one of the gasification zones for the gasification medium to contact and partially combust the solid fuel under the formation of separate conflagration fronts in the gasification zones with attendant generation of additional heat that brings the solid fuel to the requisite gasification temperature; means for discharging the hot tar-containing generator gas produced in both gasification zones from a region situated between the two gasification zones; contact means interposed in the discharging means and operative for contacting the ballast bodies in a contact zone with the hot tar-containing generator gas to heat the ballast bodies prior to their mixing with the solid fuel and for the ballast bodies to capture and return into the respective gasification zone at least a significant proportion of the tar contained in the generator gas; and means for recycling the ballast bodies after their discharge, together with ashes resulting from the gasification process, from the gasification zones, including means for separating the ballast bodies from the ashes, and means for returning the separated ballast bodies into the contact zone.

The admixing means advantageously includes a conduit leading from the contact zone to one of said gasification zones, and the arrangement of the present invention advantageously further comprises means including a filling shaft for introducing the solid fuel into one of said gasification zones, and means for introducing a drying gaseous medium into the filling shaft upwardly of the conduit for the drying gaseous medium to flow in countercurrent through the solid fuel and engulf the same for drying such solid fuel in the filling shaft.

Particular advantages of the method and arrangement of the present invention are that they render it possible to reduce the size of the installation for the same solid fuel throughput due to the provision of the two separate gasification zones, that they improve the efficiency and economy of the gasification process due to the return of some of the thermal energy and of the tar and other still combustible substances which would otherwise be lost back into the gasification zone with the ballast bodies, and that they result in a high degree of purification of the generator gas.

BRIEF DESCRIPTION OF THE DRAWING

A more complete appreciation of the present invention and many of the attendant advantages thereof will be readily appreciated as the invention becomes better understood by reference to the following detailed description when considered in connection with the accompanying sole FIGURE of the drawing which is a schematic illustration of gasification arrangement of the present invention.

DETAILED DESCRIPTION OF THE PREFERRED EMBODIMENT

Referring now to the drawing in detail, it may be seen that the reference numeral 2 has been used therein to identify a generator for the gasification of solid fuels. A generator gas discharge conduit 1 communicates with the interior of the generator 2 between two gasification zones, as will be more fully discussed later. A gasification medium is supplied to the two gasification zones through respective supply conduits 7 and 7'. The gasification medium which is supplied through the supply conduit 7 flows through a respective first gasification zone of the generator 2 in countercurrent to the solid fuel to be gasified and it is gradually consumed as it contacts the solid fuel during the conversion of such solid fuel into combustible gas which is then discharged from the interior of the generator 2 through the discharge conduit 1. On the other hand, the supply conduit 7' supplies the gasification medium conducted thereby into the respective second gasification zone for this gasification medium then to concurrently flow through the solid fuel present in this second gasification zone and for the combustible generator gas generated in this second gasification zone to be also discharged from the interior of the generator 2 through the discharge conduit 1.

The solid fuel to be gasified is introduced into the interior of the generator 2 through a filling shaft 4. A downstream end of a conduit 5 for hot ballast bodies opens into the bed of the solid fuel in the vicinity of the connection of the supply conduit 7' with the interior of the generator 2. The hot ballast bodies heat the solid fuel up to such a temperature that only a small amount of or almost no additional thermal energy is needed for the achievement of the requisite gasification temperature. The hot generator gas produced in the interior of the generator 2 flows between and around the ballast bodies in a contact apparatus 3 which is incorporated in the discharge conduit 1, so that the hot generator gas is cooled down and the ballast bodies are heated up in direct heat exchange between the gas and the bodies. The ballast bodies further capture the precipitated tar and also, in all instances, dust from the hot generator gas, such captured materials being brought by the ballast bodies back into the interior of the generator 2 where such materials, to the extent that they are still carbonaceous, are converted by contact with the gasifying medium into the generator gas.

The ballast bodies, after having been introduced into the interior of the generator 2, move concurrently with the solid fuel through such interior until they are removed, together with ashes or cinders, through an ash discharge opening 8. After the mixture of the ballast bodies and ashes has been so discharged from the interior of the generator 2, it is delivered into a sieving apparatus 9 where cooling of the entrained ashes is performed simultaneously with separation of the ballast bodies from the ashes. Flue gas supplied from a non-illustrated combustion installation through a conduit 10, or even air, is heated in this sieving apparatus 9 by the hot ballast bodies. The thus heated gas, especially flue gas, is then supplied through a connecting conduit 6 into the interior of the filling shaft 4 to pre-heat the solid fuel contained therein.

A partial flow of the heated flue gas, which contains $CO_2$ and also water vapor, is branched off from the connecting conduit 6 into another conduit 11 which then delivers this partial flow to the supply conduit 7 for mixing with the gasification medium, so that the gasification medium is enriched by $CO_2$ and/or $H_2O$ and is also heated. For further enrichment with water vapor, fresh steam can be admixed to the partial flow or directly to the flow of the gasification medium through a steam conduit 12.

The ballast bodies which have been separated in the sieving apparatus 9 from the entrained ashes are conveyed through a conduit 14 into the contact apparatus 3. An air lock 13 is interposed in the conduit 14 at the outlet of the sieving apparatus 9 to prevent or at least minimize propagation of oxygen through the conduit 14 into the contact apparatus where it would otherwise react with the hot generator gas. Furthermore, a cyclone separator 15 is interposed in the conduit 6 upstream of the branching-off point of the conduit 11 to separate fly ash which may be entrained in the gas leaving the sieving apparatus 9 from such gas.

It is, of course, also possible and contemplated in the framework of the present invention to arrange a heat exchange apparatus upstream of the sieving apparatus 9 to heat air which is then used for drying the wet solid fuel to be gasified. This is particularly advantageous and desired when sewage sludge, possibly with lignite, is to be gasified.

Obviously, numerous modifications and variations of the present invention are possible in the light of the above teachings. It is therefore to be understood that, within the scope of the claims appended hereto, the invention may be practiced otherwise than as specifically disclosed herein.

What is claimed is:

1. A method of generating low-tar generator gas from a solid, bituminous fuel, comprising the the steps of
    converting the solid fuel into tar-containing generator gas in two gasification zones arranged one above the other, including
    introducing hot ballast bodies into the upper gasification zone so as to preheat the solid fuel therein by contact with said hot ballast bodies which are thus admixed with the solid fuel;
    introducing a gasification medium which at least in part contains oxygen and water vapor from above into the upper one of said two gasification zones and from below into the lower one of said two gasification zones, whereby the gasification medium contacts the partially combusts the solid fuel under the formation of separate conflagration fronts in said gasification zones with attendant generation of additional heat that brings the solid fuel to the gasification temperature thereof;
    discharging the hot tar-containing generator gas produced in said two gasification zones from a region situated between the two gasification zones;
    contacting the ballast bodies in a zone separate from said gasification zones with the hot tar-containing generator gas from said gasification zones to preheat the ballast bodies prior to the mixing of the same with the solid fuel, whereby said ballast bodies capture at least a significant proportion of the tar contained in the generator gas and carries said tar with it into the upper gasification zone;
    discharging the ballast bodies together with ash resulting from the gasification process from the lower gasification zone;
    separating the ballast bodies from the ash; and
    returning the separated ballast bodies into said zone separate from said gasification zones.

2. The method as defined in claim 1, comprising the step of controlling the location of the conflagration fronts by controlling the amounts of the gasification medium introduced above and below the region of discharge of the hot generator gas, respectively.

3. The method as defined in claim 1, and further comprising the step of
    regulating the temperature at least in the lower one of the gasification zones, by enriching the gasification medium introduced into the respective gasification zone with an additional amount of at least one of water vapor and $CO_2$.

4. The method as defined in claim 1, wherein said separating step includes sieving fine ash from the ballast bodies.

5. The method as defined in claim 1, wherein said contacting step includes utilizing the ballast bodies which are colder than the hot tar-containing generator gas as filtering material for precipitated tar particles and dust present in the generator gas which collect on the exposed surfaces of the ballast bodies and are thus returned into the respective gasification zone with the ballast bodies for heating the solid fuel in the respective gasification zone.

6. The method as defined in claim 1, and further comprising the step of cooling the ballast bodies after their discharge from the respective gasification zone by contacting the same with a gaseous medium, and utilizing the thus heated gaseous medium for drying the solid fuel prior to its introduction into the respective gasification zone.

7. The method of claim 3, wherein the gasification medium is enriched by adding fresh steam thereto.

8. The method of claim 6, comprising the additional steps of
    branching off a partial flow of the thus-heated gaseous medium; and
    mixing the branched off partial flow with the gasification medium introduced into a gasification zone to enrich the same.

9. The method of claim 8, wherein the branched off partial flow is mixed with the gasification medium introduced into the lower gasification zone.

10. The method of claim 1, comprising the additional step of
    minimizing propagation of oxygen with the return of the separated ballast bodies into said separate zone.

11. The method of claim 6, comprising the additional step of
    separating out fly ash which might be entrained in the thus-heated gaseous medium by passing the same through a cyclone separator.

* * * * *